(12) United States Patent
Frisch et al.

(10) Patent No.: US 6,352,384 B1
(45) Date of Patent: Mar. 5, 2002

(54) SELF-LOCKING FLEXPLATE

(75) Inventors: Jason Frisch, Plymouth; Henry L Stewart, Jr., Southgate; David E Spieth, Canton; Matthew Svoboda, Fowlerville; David Rygiel, Howell; David A. Salvatori, South Lyon; Michael Bowen, Hickory Corners; Thaddeus S Zaydel, Waterford; Timothy A Puente, Grosse Ile, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/470,781

(22) Filed: Dec. 23, 1999

(51) Int. Cl.[7] ............................................... F16D 13/22
(52) U.S. Cl. ....................... 403/348; 403/350; 403/329; 403/1; 74/572
(58) Field of Search ............................ 403/13, 14, 315, 403/316, 317, 1, 329, 326, 327, 348, 350, 332; 74/572

(56) References Cited

U.S. PATENT DOCUMENTS

| | | |
|---|---|---|
| 4,502,279 A | 3/1985 | Fuehrer |
| 4,765,013 A * | 8/1988 | Lowe ........................... 15/180 |
| 5,121,821 A | 6/1992 | Poorman et al. |
| 5,125,487 A | 6/1992 | Hodge |
| 5,342,242 A | 8/1994 | Ladd et al. |
| 5,347,673 A * | 9/1994 | Nickels, Jr. .............. 403/348 X |
| 5,385,222 A | 1/1995 | Otto et al. |
| 5,398,562 A | 3/1995 | Muchmore |
| 5,407,047 A | 4/1995 | Weidinger et al. |
| 5,477,950 A | 12/1995 | Maloof |
| 5,480,012 A | 1/1996 | Polubinski |
| 5,480,016 A | 1/1996 | Kurz et al. |
| 5,788,399 A * | 8/1998 | Smerarsoll .............. 403/348 X |
| 5,797,540 A | 8/1998 | Kern |
| 5,799,766 A | 9/1998 | Link et al. |
| 5,868,624 A | 2/1999 | Fukushima et al. |

* cited by examiner

Primary Examiner—Lynne H. Browne
Assistant Examiner—John R. Cottingham
(74) Attorney, Agent, or Firm—Ralph E. Smith

(57) ABSTRACT

A self-locking, twist & lock, system for attachment of an engine flexplate to a torque converter mounting plate including a plurality of lugs carried on the end surface of the torque converter mounting plate in a circumferentially spaced-apart relationship to one another. A snap-lock spring retainer is releasably secured to each of the lugs. The flexplate has a plurality of retainer receivers in a circumferentially spaced-apart relation identical to the placement of the lugs. Each of the retainer receivers defining a retainer bar segment and openings for receiving the lugs and spring retainers. Each spring retainer has a flexible head portion adapted to engage a corresponding retainer bar segment to secure the plates together.

12 Claims, 3 Drawing Sheets

SELF-LOCKING FLEXPLATE

This invention relates generally to an engine flexplate assembly for a vehicle and more particularly to a self-locking system for connecting a torque converter assembly to a flexplate.

BACKGROUND OF THE INVENTION

Typically, a torque converter is connected to the engine's flexplate by a simple bolted connection. The resultant assembly process consists of lining up the flexplate and the torque converter plate, hand-starting several threaded fasteners in aligned holes in the torque converter and in the flexplate, and tightening the fasteners with an impact wrench. Because of space restrictions and access only at a lower position, it is necessary to rotate the engine (and the attached flexplate) and stop at a position to tighten the fasteners one at a time. Considerable time is required to accomplish this, depending upon the number of fasteners involved.

SUMMARY OF THE INVENTION

In accordance with the present invention, a plurality of lugs are welded or otherwise secured to either the flexplate or the torque converter mounting plate. In a preferred arrangement, the lugs are welded to the torque converter mounting plate. Snap-lock type spring retainers are attached to the lugs to form a lock assembly. Each spring retainer has a head portion which is adapted to snap into engagement with a retainer bar portion of the flexplate for securing the two together. This locking action only requires a few degrees of rotation between the torque converter and the flexplate to cause all the lock assemblies to engage in a locking arrangement simultaneously and automatically. The snap-lock spring retainers are secured to the lugs by readily releasable fasteners, making it possible to pre-assemble the retainers to the torque converter before final assembly of the unit to the flexplate. This attachment system of the spring retainers also permits an easily accomplished release of the spring retainers to disconnect the torque converter from the flexplate for service replacement or repair.

Further in accordance with the invention, the lug mounts are located on the torque converter mounting plate in circumferentially spaced-apart relation to one another in a circle of given diameter which is concentric with the central axis of the torque converter. The flexplate has a plurality of retainer bars segments, equal in number to the number of lugs and spring retainers. Each bar segment is disposed in a circle of the same given diameter which is concentric with the central axis of the flexplate in the same equally, circumferentially spaced-apart relationship as the lugs and spring retainers. During assembly of the torque converter to the flexplate, relative rotation between the torque converter and the flexplate causes each snap-lock spring retainer to simultaneously engage the associated bar segment on the flexplate to secure the two units together.

Preferably, each snap-lock spring retainer has a flat body portion which engages an associated flat portion of a lug. A locking head portion then projects away from the flat body portion of the lug to form a cantilevered lock portion. The corresponding bar segment on the flexplate to which the lock portion engages is defined by a pair of adjacent slots formed therethrough. The bar segments extend in a radial direction of the flexplate and between the pair of adjacent slots. Thus the slot pair forms a first and a second opening circumferentially at opposite sides of the retainer bar segment. The cantilevered lock portion of each of the spring retainers is first inserted through the first opening, and then the torque converter is rotated relative to the flexplate causing the cantilevered lock portions to flex as each moves across an associated bar segment. Finally, a hooked end portion of the cantilevered lock portion snaps over the bar segment to retain the units.

One object of this invention is to provide a system for attaching a flexplate to a torque converter plate having the foregoing features and capabilities.

Another object is to provide a system for attaching a torque converter mounting plate to a flexplate which system consists of a relatively few simple parts, and is capable of connecting the two plates together quickly and easily upon only a slight relative rotation between the of torque converter and the flexplate.

These and other objects, features and advantages of the invention will become more apparent as the following description proceeds, especially when considered with the accompanying drawings.

DETAILED DESCRIPTION OF THE PREFERRED EMBODIMENT

Figure 1:
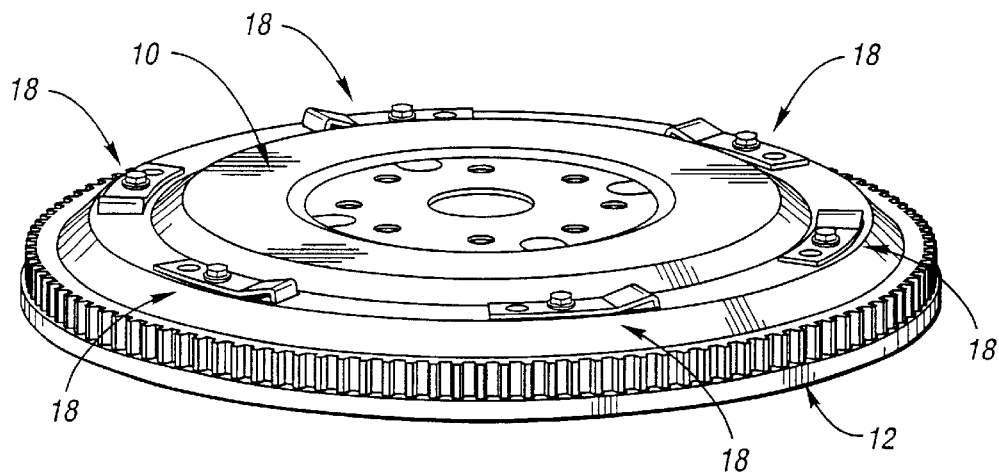
FIG. 1 is a perspective view of an engine flexplate and torque converter mounting plate attached together by the subject system of snap-lock spring retainers engaging retainer bar segments.
Figure 2:
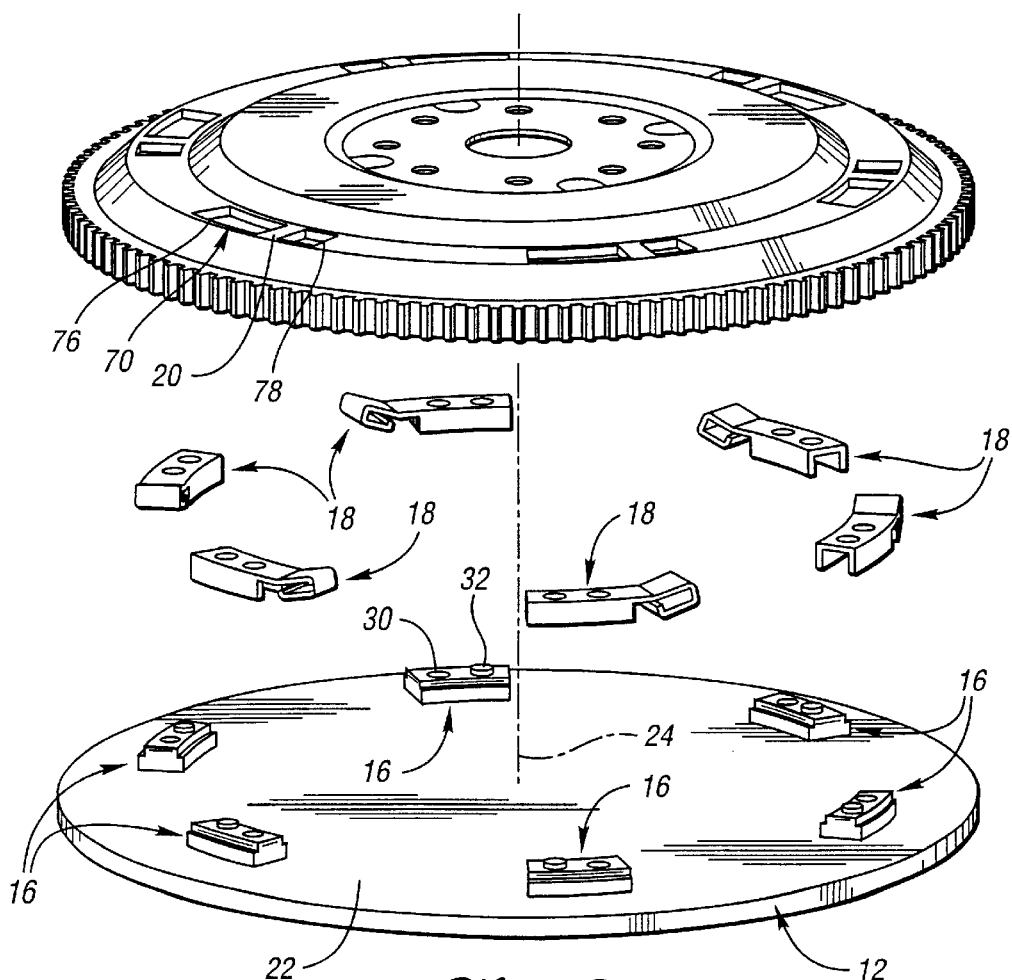
FIG. 2 is an perspective, exploded view of the assembly shown in FIG. 1.

Referring now more particularly to FIGS. 1–7, a circular flexible plate or flexplate 10 is shown attached to a circular torque converter mounting plate 12. The two members 10, 12 are releasably secured together in parallel face-to-face relationship by a self-locking system including: a plurality of lugs 16 carried on a surface of the torque converter mounting plate 12; snap-lock spring retainers 18 attached to the lugs; and retainers in the form of bar segments 20 formed by the flexplate 10.

More particularly, a plurality of the lugs 16 are formed on a face or surface 22 of the torque converter mounting plate 12. Face 22 faces flexplate 20. In the subject embodiment, six lugs are carried by the plate 12 but the number of lugs may be changed, as desired. The lugs are welded or otherwise secured to the face 22 of the torque converter plate in a circumferentially spaced-apart relationship and as defined by a circle concentric with the central axis 24 of the torque converter plate. Preferably, the lugs 16 are all identical but do not have to be identical. Each of the lugs is elongated in a circumferential direction and defines a flat outer surface 26 extending parallel to the face 22 of the torque converter plate 12. The flat surface 26 has a threaded bore 30 and, spaced circumferentially from the bore, a locating feature such as stud 32 projecting axially outwardly from the flat surface 26. Each lug also has sides 34 and 36 extending perpendicular to the surface 26 and parallel to a line connecting the bore 30 and stud 32. A pair of surfaces or shoulders 37 extend at a lower elevation relative surface 26 and radially from each side surface 34, 36.

A snap-lock spring retainer 18 is mounted to the required number of lugs 16. Each snap-lock spring retainer has a main body portion 42 and an integral head portion 44 extending from the main body portion. The body portion 42 is elongated and has a substantially flat central portion with flanges 45 along each side and extending perpendicular thereto. The central portion has two longitudinally spaced holes 46 and 48 formed therethrough. The head portion 44 has an integral end extension which is folded over in an open loop. The snap-lock spring retainer 18 is made of a relatively stiff material such as spring steel which is strong but resilient and sufficiently flexible to flex readily as will be detailed hereinafter.

The snap-lock spring retainer 18 is mounted on an associated lug 16 by aligning hole 48 with the stud 32 and extending the retainer over a stud 32. This effectively aligns the bore 46 with the threaded bore 30 of the lug. The bolt fastener 50 is then inserted through hole 46 in the retainer body 42 and into the threaded bore 30. Additionally, flanges 45 of retainer body 42 embrace the sides 34, 36 of the lug align holes 46, 48 with the bore 30 and stud 32.

Figure 3:
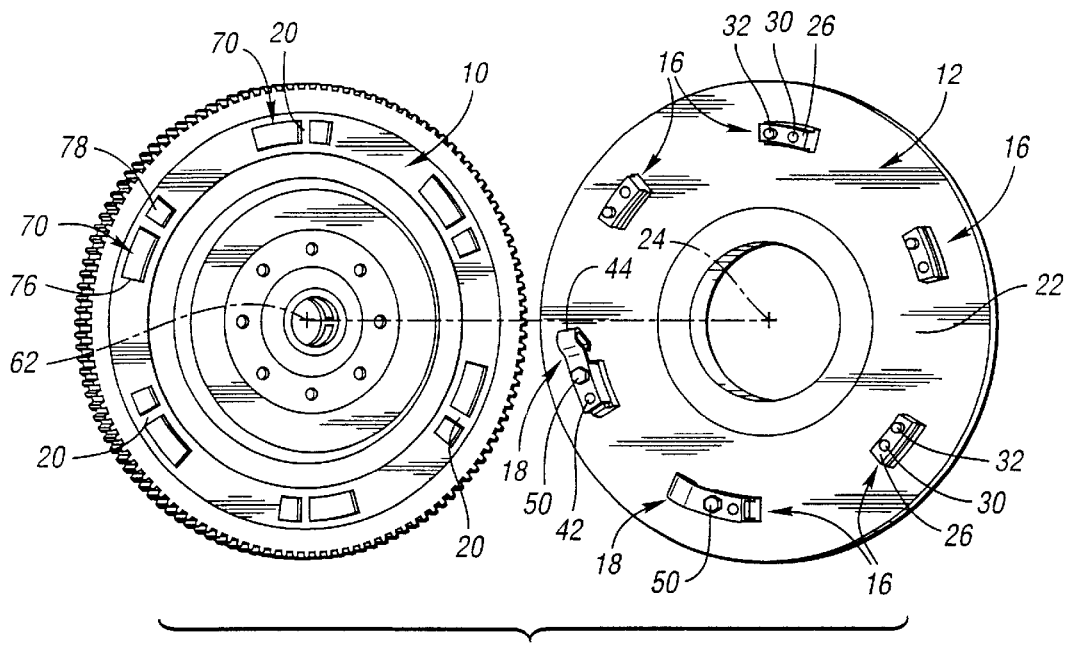
FIG. 3 is a perspective view of the flexplate and the torque converter mounting plate prior to attachment together and with two of the spring retainers mounted to lug portions of the mounting plate.
Figure 4:
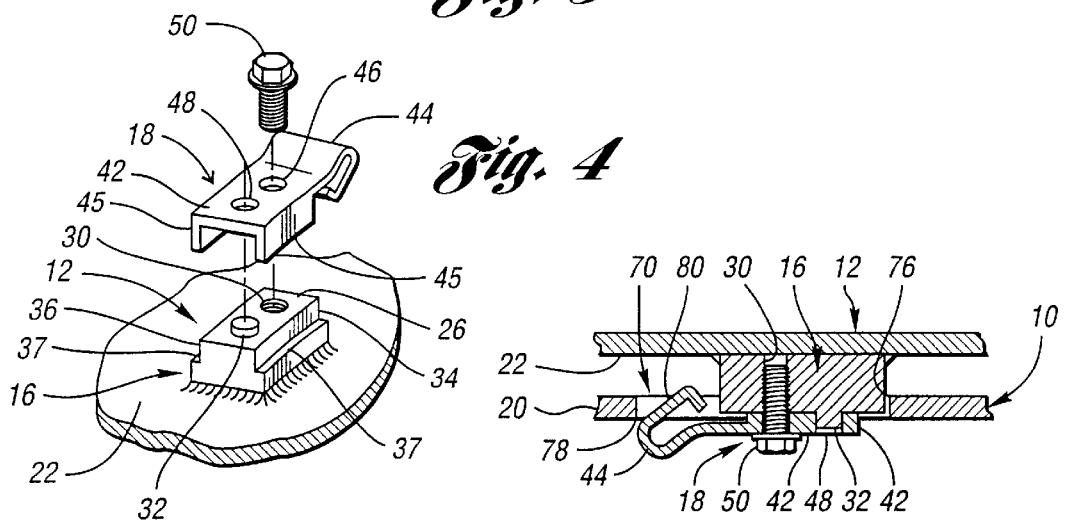
FIG. 4 is a perspective, exploded view of a single lug, snap-lock spring retainer and the attaching bolt.

As best shown in FIG. 3, the flexplate 10 presents a plurality of the retainer bar segments 20, equal in number to the lugs and spring retainers of the plate 12. The bar segments 20 are disposed in a circle of the same radius as the circle of the lugs 16 and the circle is concentric with the central axis 62 of the flexplate 10. The retainer bar segments 20 are in the same circumferentially spaced-apart relation as the lugs 16. More specifically, a plurality of slot arrangements 70 are formed through the flexplate, each slot arrangement consists of a pair of slightly circumferentially spaced openings, one slot arrangement being associated with each retainer bar segment 20. Each slot arrangement 70 includes an opening large enough to accommodate the entire length and width of a spring retainer 18. Each retainer bar segment 20 is actually defined between the large opening which described in the previous sentence and a smaller opening which together define the slot arrangement 70. In other words, each bar segment 20 extends radially across and between the two openings which form the slotted arrangement. The bar segment 20 essentially divides the slot arrangement 70 into the first and second circumferentially space-apart openings 76 and 78. The retainer bar segments 20 are integral with the flexplate 10.

Figure 5:
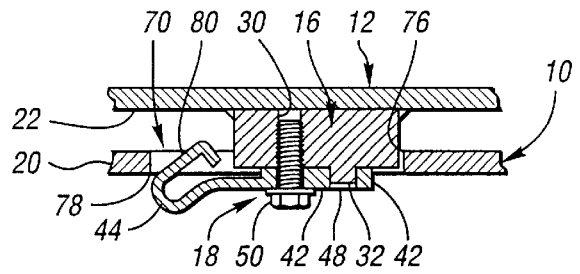
FIG. 5 is a fragmentary sectioned view of portions of the flexplate and torque converter mounting plate, showing the subject lug supported snap-lock spring retainer in relation to a retainer bar segment prior to a rotative attachment of the torque converter mounting plate and the flexplate.
Figure 6:
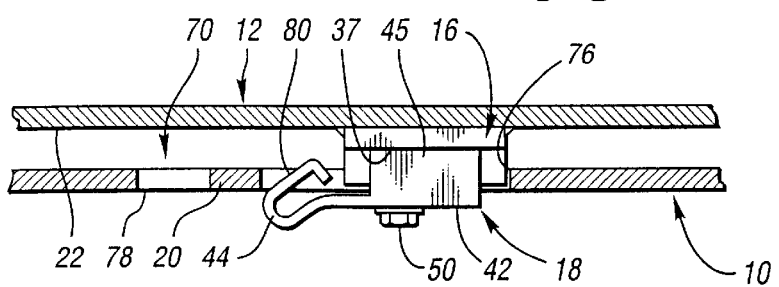
FIG. 6 is a view similar to FIG. 5 but illustrating the lug supported snap-lock spring retainer in elevation.

When it is desired to attach the torque converter plate 12 to the flexplate 10, the torque converter is brought axially toward the flexplate so that they are in parallel face-to-face relation with respective central axes 24, 62 aligned. The torque converter plate 12 is adjusted so that the lug supported spring retainers 18 register or are aligned with the first openings 76 in the flexplate. After the two units are moved close together in an axial direction, the lug-supported spring retainers project through the first openings 76 as shown in FIGS. 5 and 6. In this pre-assembly position, the retainer's head 44 also projects into the first opening 76. However, the head 44 has an end portion with a generally loop-like configuration with a surface angled relative to the adjacent retainer bar segment 20. This surface serves as camming surface 80.

Figure 7:
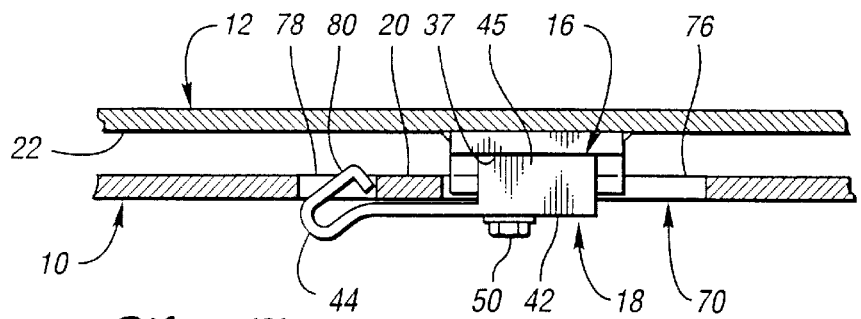
FIG. 7 is a view similar to FIG. 6 showing the snap-lock spring retainer moved to a locked position where it engages a retainer bar segment after the torque converter mounting plate is rotated relative to the flexplate.

To complete the assembly of the two units together, the torque converter plate 12 is then rotated from the position of FIGS. 5 and 6 to the position shown in FIG. 7. As the torque converter plate 12 is rotated, the head portion's camming surface 80 is resiliently sprung or flexed axially outwardly by its engagement with the retainer bar 20. On further relative rotation the end of the head portion 44 snaps over the retainer bar 20 and lodges or settles into the second opening 78 in the flexplate to lock the units together.

Because of the circumferential spacing of the lug supported retainers 18 and the retainer bars 20, all of the head portions 44 of the snap-lock spring retainers 18 snap into place in the second openings 78.

When it is desired to separate the two units from one another for service or replacement, the threaded fastener 50 can be removed which disconnects each spring retainer 18 from its lug support. The plate 12 and lugs are then readily withdrawn from openings 76 in the flexplate.

Figure 8:
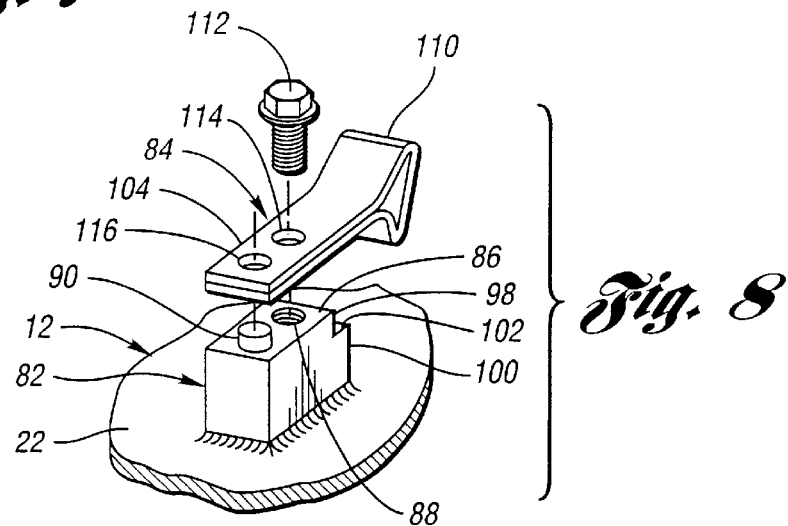
FIG. 8 is an exploded view like FIG. 4, but showing a modification.
Figure 9:
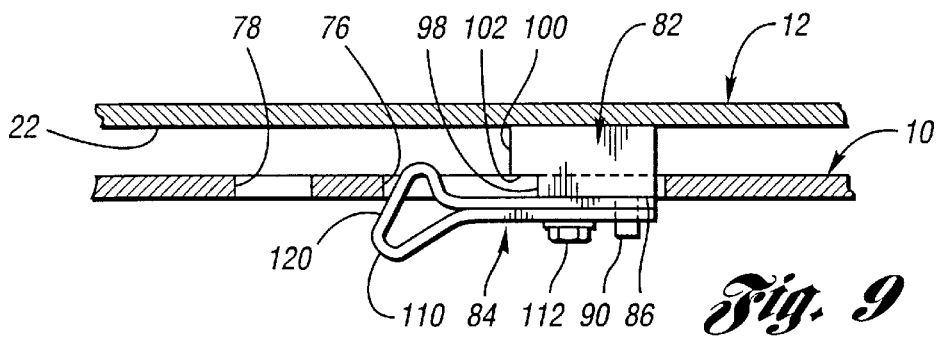
FIG. 9 is a view similar to FIG. 6, showing the modification of FIG. 8 in a pre-locking position relative to a retainer bar segment prior to the relative rotation of the torque converter relative to the flexplate.
Figure 10:
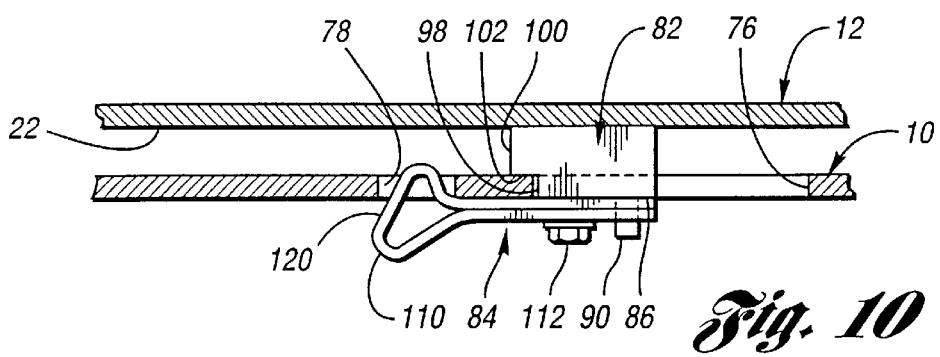
FIG. 10 is a view similar to FIG. 7, showing the modification of FIG. 8 in a locked relation to a retainer bar segment after rotation of the torque converter relative to the flexplate.

In FIG. 8–10, a modified snap-lock spring retainer 84 mounted on a lug 82 is illustrated. A plurality of the lugs 82 are welded to the face 22 of the torque converter plate 12 in the same spaced relationship as described in connection with FIGS. 1–7. Each lug 82 is elongated circumferentially and has a flat top or outer surface 86 extending parallel to face 22 of the torque converter plate 12. The surface 86 has a threaded bore 88 and, spaced circumferentially from the bore 88, a locating feature such as the stud 90 projecting axially outwardly from the surface 86.

One end of each lug 82 has a stepped configuration with inner and outer end surfaces 98 and 100 extending perpendicular to surface 86. A shoulder 102 is formed between the surfaces 98, 100.

A snap-lock spring retainer 84 is mounted on each of the lugs 82. Each snap-lock spring retainer 84 is made from an elongated strip of spring steel as with the first embodiment but here the material is doubled over along itself so that the main body portion 104 has two end portions compressed together in overlying surface-to-surface contact. The two end portions are connected together at the leftward end of the body by an intermediate portion which is in the form of a closed loop. The closed loop provides a head portion 110 corresponding to the head portion 44 of the first embodiment.

A threaded fastener 112 extends through a hole 114 formed in the retainer's body portion 104 and threads into bore 88 provided by the lug 82. The stud 90 projects into a hole 116 formed in the retainer's body portion 104 to releasably secure align the snap-lock spring retainer 84 on the lug.

It will be understood that the torque connector plate 12 with lugs 82 and attached snap-lock spring retainers 84 engage the retainer bar segments 20 of the flexplate in the same manner as previously described in connection with the embodiment of FIGS. 1–7. The head portion 110 will be seen to have a camming surface 120, similar to the camming surface 80 in the previous embodiment. The camming surface 120 engages the retainer bar 20 when plates 12 is rotated relative to plate 10 from the position shown in FIG. 9 to the position shown in FIG. 10. As the two plates move relative to one another, the head portion 110 springs or flexes axially outward from the surface of plate 12 and moves past the retainer bar 20. Subsequently, it snaps into the second opening 78 to lock the two plates together.

The procedure to lock the two plates 10, 12 together using modified spring retainer 84 is the same as for the embodiment of FIGS. 1–7. However, it should be noted that when the plates 10, 12 are finally in the locked position shown in FIG. 10, one side edge (rightward edge) of each retainer bar 20 engages the inner surface 98 and the shoulder 102 of the associated lug 82. This positively and accurately locates the lugs in relation to the retainer bars.

What is claimed is:

1. A self-locking system adapted for attaching a circular flexplate of an engine to a circular torque converter plate, said system comprising:

a plurality of lugs mounted on said torque converter plate in a circumferentially spaced-apart relation to one another and arranged in a circle of fixed diameter concentric with a central axis of said torque converter plate, a snap-lock spring retainer supported by each of said lugs;

means for releasably securing each of said snap-lock spring retainers to an associated one of said lugs;

said flexplate having a plurality of retainer bar segments, equal in number to said lugs and disposed in the same fixed diameter circle as said lugs and being concentric with respect to a central axis of said flexplate, each of said snap-lock spring retainers having a resilient end head portion adapted to engage a corresponding retainer bar segment to secure said plates together when one plate is rotated relative to the other plate.

2. The self-locking system as defined in claim 1, wherein each of said snap-lock spring retainers has a flat body portion and a locking head portion, said body portion being disposed on an associated one of said lugs with said locking head portion extending from said body beyond the extent of said associated one of said lugs, said locking head portion being flexibly and resiliently connected to said body portion so as to permit outward flexure thereof from said torque converter mounting plate and with an end configuration adapted to engage said retainer bar segment and snapping around said retainer bar segment.

3. The self-locking system as defined in claim 2, wherein said flexplate has a plurality of slotted arrangements consisting of a pair of openings, one adjacent either of the sides of said retainer bar segments, wherein said retainer bar segment extends in the radial direction between said pair of openings thereby defining first and second circumferentially spaced openings, said first opening being configured to permit a lug supported snap-lock spring retainers to be inserted therein, and upon a relative rotation of one plate with respect to the other plate movement of an end of said head portion into said second opening thereby engaging said retainer bar segment.

4. The self-locking system as defined in claim 3, wherein each of said head portions defines an end cammed surface which engages the associated retainer bar segment upon the said relative rotation of said plates to cause said head portion to flex outward from the plate and snap over said retainer bar and into the second opening.

5. The self-locking system as defined in claim 4, wherein said means for releasably securing said snap-lock spring retainers to said lugs comprises a threaded fastener extending through a hole in said retainer's body portion and threading into a threaded bore in the associated lug, each of said lugs also having a locating feature projecting therefrom spaced from said threaded bore and in a circumferential direction of the plate, a hole in the body portion configured to receive said locating feature.

6. The self-locking system as defined in claim 5, wherein the body portion of each of said snap-lock spring retainers has flanges formed along opposite side edges thereof for embracing opposite sides of the associated lug.

7. The self-locking system as defined in claim 5, wherein each of said snap-lock spring retainers comprises an elongated strip of resilient material which is doubled over back on itself to form a double thickness body and an end portion forming a generally loop shaped head portion with an angled camming surface.

8. The self-locking system as defined in claim 7, wherein each of said lugs has an end configuration with an inwardly spaced end surface, an outwardly spaced end surface and a connecting shoulder surface, said inner surface and shoulder surface of each of said lugs tightly engaging an edge portion of the associated retainer bar segment when said plates are secured together.

9. A coupling arrangement between an engine and a torque converter, said arrangement comprising:

a flexible plate on the engine;

a torque converter plate adjacent to the flexible plate;

a plurality of outwardly projecting lugs mounted on the face of one of the plates, each lug spaced in a circumferential direction and a fixed radius from the center of the plate;

a snap-lock spring retainer mounted on each lug; and a plurality of retainer receivers of the other plate arranged in a circumferentially spaced relationship and at the same given radius as said lugs on the one plate, wherein the snap-lock spring retainers being adapted to engage the retainer receivers to secure the plates together.

10. The self-locking system as defined in claim 9, wherein said lugs are disposed in an arcuate and equally spaced-apart circumferential relationship, and said retainer receivers are disposed in the same equally spaced-apart relation as said lugs.

11. The self-locking system as defined in claim 9, further including means for releasably securing each of said snap-lock spring retainers to a lug.

12. The self-locking system as defined in claim 9, wherein each snap-lock spring retainer has a body portion secured to the associated one of said lugs, and a flexible and resilient locking head portion extending from said body portion so as to engage said retainer bar.

* * * * *